United States Patent
Nair et al.

(10) Patent No.: US 11,568,205 B1
(45) Date of Patent: Jan. 31, 2023

(54) CAUSAL IMPACT ESTIMATION MODEL USING WARM STARTING FOR SELECTION BIAS REDUCTION

(71) Applicant: Amazon Technologies, Inc., Seattle, WA (US)

(72) Inventors: Naveen Sudhakaran Nair, Issaquah, WA (US); Pragyana K. Mishra, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 999 days.

(21) Appl. No.: 16/253,913

(22) Filed: Jan. 22, 2019

(51) Int. Cl.
*G06N 3/04* (2006.01)
*G06N 3/08* (2006.01)

(52) U.S. Cl.
CPC ............. *G06N 3/0454* (2013.01); *G06N 3/08* (2013.01)

(58) Field of Classification Search
CPC .............................. G06N 3/0454; G06N 3/08
See application file for complete search history.

(56) References Cited

U.S. PATENT DOCUMENTS

2019/0096526 A1\* 3/2019 Hirsch ................ G06F 21/6245
2020/0134420 A1\* 4/2020 Spooner ................ G06F 16/907

\* cited by examiner

*Primary Examiner* — Brian M Smith
*Assistant Examiner* — Henry Trong Nguyen
(74) *Attorney, Agent, or Firm* — K&L Gates LLP

(57) ABSTRACT

Techniques are generally described for causal impact estimation using machine learning. A first machine learning model is trained using non-treatment variables during training. A second machine learning model uses learned weights from the first machine learning model for non-treatment variables and is trained on one or more treatment variables. The second machine learning model estimates outcomes based on the presence or absence of an event represented by the treatment variable. Selection bias is reduced by warm-starting the second machine learning model with non-treatment variable weights learned during training of the first machine learning model.

20 Claims, 6 Drawing Sheets

CAUSAL IMPACT ESTIMATION MODEL USING WARM STARTING FOR SELECTION BIAS REDUCTION

BACKGROUND

Machine learning is a field of artificial intelligence that allows computer-implemented systems to perform a task (such as predicting an outcome) without the use of task-specific code. Machine learning systems may be trained to progressively improve performance of a task using sets of training data. In supervised machine learning, annotated data (e.g., data with a labeled input and desired output) can be used to "train" a machine learning model. During training, parameters (e.g., weights and/or biases) of the machine learning model are adjusted so that the output of the machine learning model for a given input matches the desired output from the annotated data. Thereafter, during inference, the trained machine learning model can make predictions when provided with unannotated input data. Accuracy and/or predictive value of machine learning models are often a function of the quantity and quality of annotated data used to train the machine learning model.

DETAILED DESCRIPTION

Figure 1:
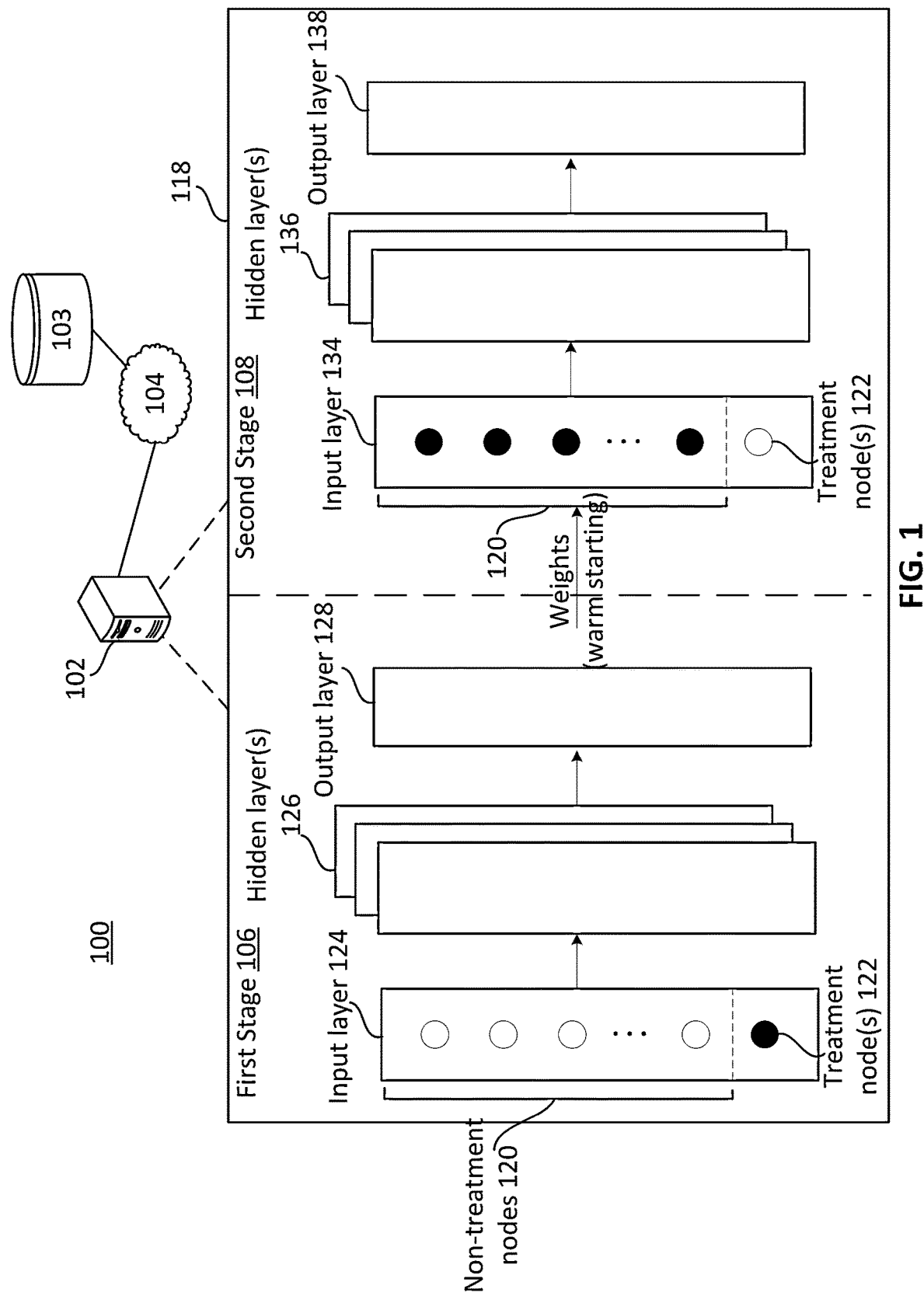
FIG. 1 is a block diagram showing an example system effective to train a causal impact estimation model, in accordance with various aspects of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In complex and real-world systems, it is often difficult to determine the incremental impact of a single action on an outcome or output of the system. For example, a person may have a headache at time A. Following the onset of the headache, the person may take a headache medicine, may eat food, and may take a nap. Following these diverse actions, at time B, the person may no longer have the headache. It can be difficult to find the incremental impact of each of these actions on the outcome (e.g., the lack of a headache). Additionally, it is difficult to capture the interactions between different actions. For example, what is the impact on bird migration patterns due to an increase in the average global temperature and due to changing sea levels? In many cases, the actions of a system may be diverse and may appear to be disassociated from one another. For example, two subjects may take different intermediate actions, in a different sequence, and may arrive at the same outcome (e.g., no headache). In such circumstances, it may be difficult to determine the causal incremental impact of one action on the outcome using traditional approaches. It may be difficult to account for any selection bias that is inherent during the selection of subjects who have taken a particular action (e.g., a nap) and other subjects who have not taken the particular action.

Described herein are causal impact estimation machine learning models that are effective to minimize the selection bias. Implicit and direct approaches are used to generate "synthetic twins" (sometimes referred to herein as synthetic twin data). Synthetic twin data is a form of control data that corresponds to a set of factual data in every relevant dimension except the treatment variable (e.g., the variable for which causal impact is being determined). In various examples, treatment variables may be associated with exposure by an individual and/or system to an event of interest. In the example above, the person takes headache medicine, eats food, and takes a nap. If the treatment variable to be investigated is the effect of taking a nap on alleviation of headaches, the treatment variable may represent whether or not a person took a nap during a time period following the onset of the headache. In other words, in the example, the treatment variable may be associated with exposure to the event—"nap". The synthetic twin of the person would be a data representation of a person that took headache medicine, ate food, but did not take a nap (e.g., non-exposure or lack of exposure to the nap event). Accordingly, the synthetic twin control data may be generated by matching every relevant dimension except the treatment variable. In some examples, treatment variables may be referred to as "event" variables. In some examples, regression models may be used to generate synthetic twins by estimating the output of a system in the absence of exposure to the treatment variable (e.g., "counter-factuals"). The difference between actual (possibly de-noised) and synthetic, counter-factual output determines the impact estimate of the treatment variable on the output of the system. In various examples counter-factual data may be a representation of a person and/or system that has not been exposed to the treatment variable.

In current causal analysis systems, it is often challenging to control the influence of selection bias on the estimated causal impact of the treatment variable (e.g., estimated causal impact of exposure to the event associated with the treatment variable). For example, many approaches that match the treatment and control groups (e.g., those that have been exposed to the treatment variable and those that have not) before doing the causal analysis are based on projections and thus might not be reducing the influence of selection bias, contrary to the assumption. Research suggests that using Random Forests or other non-linear approaches does not address the selection bias issue. Accordingly, the causal impact estimation machine learning models described herein are designed to minimize selection bias, as described below.

The causal impact estimation machine learning models described herein may include two stages. In various examples, treatment/event variables may not be used for optimization in the first stage in order to reduce any selection bias with the non-treatment variables. Selection bias is further reduced as the implicit matching may be done in a high-dimension space instead of projections like propensity score, locality-sensitive hashing ("LSH"), etc. Additionally, if there is no match on relevant non-treatment attributes, the causal impact estimation machine learning models described herein may determine that the causal impact of the particular input would be 0, rather than having inflated values as in current causal estimation systems. In some further examples, the causal impact estimation machine learning models described herein may support sequences of multiple actions. Accordingly, the same machine learning model may be used for different and diverse treatment variables. Therefore, the incrementality for one action will not be influenced by others. The isolation of incremental impact of one action (e.g., treatment variable) from others may be beneficial in understanding and valuating the true causal impact of each action. Due to its ability to isolate and model the incremental impact of individual actions in a scalable way, causal impact estimation machine learning models described herein be trained for multiple related systems (e.g., by scaling outcome and input variables to be in the same range). New actions (e.g., treatment variables) may benefit from data in established systems using the model. In various examples, the causal impact estimation machine learning models described herein may be used to forecast the impact of a potential action in a new system before implementing the action and/or system.

The understanding of cause-and-effect relationships has become important in many technology areas, in weather forecasting, medical diagnosis, product design, product and/or system launches, etc. The causal impact estimation machine learning models described herein may identify the causal and incremental impact of an individual action, feature, activity, event, system, and/or decision in a scalable manner.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. In various examples, updating the parameters of the machine learning model may be referred to as "optimizing" the model. For example, the machine learning model may use a gradient descent algorithm, or other algorithm, to incrementally adjust the weights to cause the most rapid decrease (or increase) to the output of the loss function.

FIG. 1 is a block diagram showing an example system 100 effective to train a causal impact estimation model, in accordance with various aspects of the present disclosure. In various examples, system 100 may comprise causal impact estimation model 118. In various examples, causal impact estimation model 118 may be implemented by one or more computing devices 102. Additionally, as described herein causal impact estimation model 118, first stage 106, and/or second stage 108 may be trained and/or implemented by one or more computing devices 102 in accordance with instructions stored in one or more non-transitory computer-readable memories 103. In various examples, computing device(s) 102 and/or memories 103 may be effective to communicate over a network 104.

As described herein, causal impact estimation model 118 may comprise a first stage 106 and a second stage 108. First stage 106 may be a deep neural network (DNN) including input layer 124, one or more hidden layers 126, and output layer 128. Second stage 108 may be a DNN including input layer 134, one or more hidden layers 136, and output layer 138. In various examples, the number of hidden layers, the parameter optimization process, the activation functions, and other configurations of the first stage 106 and second stage 108 may be the same. However, while weights of non-treatment nodes 120 of input layer 124 may be learned and updated during training of first stage 106, weights of treatment node(s) 122 of input layer 124 are not learned during training of first stage 106. Conversely, while weights of treatment node(s) 122 of input layer 134 may be learned and updated during training of second stage 108, weights of non-treatment nodes 120 of input layer 134 are not learned during training of second stage 108. Additionally, although in FIG. 1 input layers 124, 134 are depicted as single blocks, in various examples, each of input layers 124 and 134 can be implemented in other configurations. For example, multiple layers may be used to represent treatment nodes 122 and/or non-treatment nodes 120 in either or both of input layers 124, 134. In another example, the input layers 124, 134 may comprise one or more layers to represent treatment nodes 122 and/or one or more layers to separately represent non-treatment nodes 120.

During training, treatment node(s) 122 (representing the treatment variable) may be set to Boolean False, or other computer-readable instructions may be provided, denoting that weights associated with treatment node(s) 122 are not updated during training of first stage 106. In FIG. 1, treatment node(s) 122 is depicted as a black circle denoting that weights of treatment node(s) 122 are not updated during training of first stage 106. In other words, weights of treatment node(s) 122 may be maintained during training of first stage 106. Non-treatment nodes 120 of input layer 124 are depicted in FIG. 1 as white circles, indicating that weights associated with non-treatment nodes are updated during training of first stage 106.

As known to those skilled in the art, "nodes" in the machine learning context are data repositories that store an activation value. A layer of a machine learning network typically comprises several nodes and activation of nodes in one layer influence the activation of nodes in other layers to which the nodes are connected. Weights in machine learning are used as coefficients for the connections between nodes typically in different interconnected layers of a machine learning model. Conceptually, weights either amplify or dampen the input of a node, thereby assigning significance to inputs for the task the machine learning algorithm is attempting to learn. The activation input-weight products are summed and the sum is passed through a node's activation function to determine whether and to what extent a signal progresses further through the machine learning network to affect the ultimate outcome in the output layer of the model.

Non-treatment nodes 120 represent attributes of input features. For example, if the treatment variable is whether or not a person has taken a nap, the non-treatment nodes 120 may represent whether or not the person has taken a particular headache medicine, whether or not the person has had food, an age of the person, other medicines the person has ingested, etc. During training weights and/or biases (sometimes referred to as parameters) associated with non-treatment nodes 120 of input layer 124 and weights and/or biases of hidden layer(s) 126 may be updated to minimize a cost function (e.g., using back propagation and/or other techniques known to those skilled in the art).

During training of first stage 106, the weights of non-treatment nodes 120 of input layer 124 may be updated. Similarly, the weights of the one or more hidden layers 126 and weights between nodes of the final hidden layer and output layer 128 may be updated (e.g., from an original or previous value to an updated value) according to the particular training algorithm used. When the training of first stage 106 is completed, the weights of non-treatment nodes 120 of input layer 124 may be used to "warm start" training of second stage 108. Warm starting refers to using previously determined and/or selected weights for particular nodes instead of randomly initializing the nodes and learning the appropriate weights over one or more training cycles. In other words, the weights determined for the non-treatment nodes 120 of input layer 124 during the training of first stage 106 may be used as the weights for the non-treatment nodes of input layer 134 when initializing the second stage 108 for training. Additionally, the weights of non-treatment nodes of input layer 134 may be "frozen" (e.g., not updated) during training of second stage 108, while the weight(s) of treatment node(s) 122 may be randomly initialized or otherwise set to a low value (e.g., from −0.03 to 0.03) and updated during training of second stage 108.

Training the first stage 106 of the causal impact estimation model 118 using non-treatment variables as input (as opposed to treatment variables) effectively absorbs any selection bias realized through input features, in the data. Prediction using such a model, since trained on a reduced dimension lacking the treatment variable, generates residual error, comprising: (i) noise in the data, and (ii) the portion of the variance unexplained due to the absence of the treatment variable in the training of first stage 106. The portion of the variance unexplained due to the absence of one or multiple dimensions (e.g., one or more treatment variables) is averaged out by the model. The averaging of error, by the model, due to the absence of the treatment variable dimension(s) may not be uniform in all the other non-treatment variable dimensions. This averaging of error on other dimensions depends on the particular training algorithm used and the hyper-space that the models operate on internally. Nevertheless, once the first stage 106 is trained using non-treatment variables (and not treatment variables) as predictors using out-of-sample validation, the model has used all selection bias signals that are observable directly or indirectly.

Accordingly, first stage 106 takes the input features except the treatment variables as input and, at the output layer 128, generates the conditional expectation of the outcome in the absence of the treatment variable. The hidden layer(s) 126 compute a high dimensional non-linear function that captures most of the variance in the data, to the extent possible without using treatment variables. Further the first stage 106 may be tuned using out-of-sample validation data to prevent over-fitting to noise data.

The second stage 108 uses the weights of input layer 124 for non-treatment nodes 120 in input layer 134. The weights of treatment node(s) 122 in input layer 134 may be initialized using random low values. The second stage 108 uses treatment and non-treatment variables as predictors of output, but adjusts weights only if there is more information in treatment variables to infer the outcome. In other words, the second stage 108 adjusts weights such that the error due to the absence of treatment variables in the first stage 106 is minimized. Output layer 138 estimates the expectation of the outcome in the presence of the treatment variable. In various examples, during training of second stage 108, weights of non-treatment nodes 122 are maintained (e.g., the weights for non-treatment nodes 122 in input layer 134 are kept the same as the weights learned for non-treatment nodes 122 for input layer 124 during training of first stage 106). Weights for treatment node(s) 122 of input layer 134, weights for nodes of hidden layer(s) 136, and weights between hidden layer(s) 136 and output layer 138 may be optimized/adjusted during training of second stage 108 according to the particular training algorithm(s) used.

Once second stage 108 is trained, incremental causal impact of a particular treatment variable may be estimated by scoring input feature data twice—with and without the treatment variable set—and calculating the difference of the two estimations. In an example use case, a patient may take multiple medications and may have high blood pressure. An investigator may wish to determine the impact of a particular medicine—"Drug A"—on the patient's blood pressure. Accordingly, in the example, whether or not the patient has taken Drug A may be the treatment variable (or event). First stage 106 of causal impact estimation model 118 may be trained, as described above, to maximize or minimize (depending on the training objective) the impact of various featurized representations of non-treatment variables on the patient's blood pressure. In some examples, non-treatment variables may include information about the patient, such as height, weight, age, etc. Additionally, non-treatment variables may include featurized representations of other medications taken by the patient. The output layer 128 may generate a score representing an impact on the patient's blood pressure. Second stage 108 of causal impact estimation model 118 may be trained, as described above, to maximize or minimize (depending on the training objective) the impact of Drug A (the treatment variable) on the patient's blood pressure. As described above, during training of second stage 108, weights of the input layer 124 for non-treatment variables may be used to warm start the non-treatment variables of input layer 134. Additionally, weights of non-treatment variables in input layer 134 may be maintained during training of second stage 108, as described above. Once the second stage 108 is trained, the impact of Drug A on a patient's blood pressure may be determined by predicting the effect on the patient's blood pressure when the patient takes Drug A (e.g., generating a score with the treatment variable set to True) and by predicting the effect on the patient's blood pressure when the patient does not take Drug A (e.g., generating a score with the treatment variable set to False), and by determining the difference between the two prediction scores.

The following section explains notations and assumptions used for the causal impact estimation models described herein.

Notation and Assumptions

Binary variable T is the treatment (event participation) status with respect to a event (e.g., whether or not an individual or system experiences an event). X is the vector of individual observable characteristics of an individual or system (e.g., feature vectors representing non-treatment variables) prior to the event. y is the actual outcome or output of the system.

$Y_0$ and $Y_1$ are defined as potential outcomes when T=0 and when T=1, respectively.

Assumption 1: Unconfoundedness

For any event, every individual (or system) has two potential outcomes independent of the treatment status T (e.g., an outcome as an individual that has experienced the treatment event and as an individual that has not experienced the treatment event). Selection of one of the potential outcomes may be random under given observations:

$$Y_0, Y_1 \perp T | X \qquad (1)$$

At any instance, the treatment status makes one of the two potential outcomes observable and the other latent. That is:

$$y^i_{obs} = \begin{cases} y^i_1, & \text{if } T^i = 1 \\ y^i_0, & \text{if } T^i = 0 \end{cases} \quad (2)$$

where superscript i represents the ith individual or system.

The treatment effect (e.g., the impact of the treatment) is the difference between the two potential outcomes. That is:

$$\tau^i = Y_1^i - Y_0^i \quad (3)$$

Where $\tau^i$ is the treatment effect for customer i. Further, the expected treatment effect for an average individual or system, given the individual or system characteristics, is referred to as conditional average treatment effect, and may be stated as:

$$\hat{\tau}(x) = \mathbb{E}[Y_1^i - Y_0^i | X^i = x] \quad (4)$$

The population average may be stated as:

$$\hat{\tau} = \mathbb{E}[\hat{\tau}(X_i)]$$

Assumption 2: Functional Form

Any type of post-event outcome variable can be expressed as a function of pre-event features:

$$\mathbb{E}[Y_i|X] = F_i(X), i=0,1 \quad (5)$$

where F is some function in a low/high dimensional linear or non-linear space defined by the features.

Causal Impact Estimation Model Framework

In various examples, a Deep Neural Network (DNN), such as causal impact estimation model 118 of FIG. 1, may be trained in two stages using data for treatment individuals and control individuals. Although "individuals" may be referred to herein, it should be appreciated that systems, units, and/or other representations may instead be used in accordance with various embodiments, and that use of the term "individual" does not preclude applicability of the causal impact estimation models described herein to systems, units, etc. As such, while causal impact of events on individual behavior may be determined in some exemplary use cases, in other examples, causal impact of events may be determined on the output and/or outcome of a system or unit. However, for clarity and brevity, the term "individual" may sometimes be used herein. However, the causal impact estimation models described herein are also applicable to systems and other units and embodiments for determining the causal impact on systems and other units are explicitly contemplated herein.

Treatment individuals refer to individuals who have experienced an event represented by the treatment variable. For example, a treatment individual may have taken a particular drug, taken an action, been offered a promotion, etc. Control individuals are those individuals who have not experienced the event represented by the treatment variable. Nonetheless, control individuals are selected explicitly or implicitly by causal impact estimation model 118 to correspond as closely to the treatment individuals as possible. For example, a control individual may be an individual who has not taken a treatment variable drug, but who is the same age, approximately the same weight, and/or has the same medical conditions as a corresponding treatment individual.

The outcome of interest is represented by the activation of the nodes in the output layers (e.g., output layers 128, 138) of the causal impact estimation model 118. Pre-event features and/or descriptive features describing characteristics of the individual are represented by the activation of nodes in the input layers (e.g., input layers 124, 134). As described, the causal impact estimation model 118 does not use treatment/event variables during training of first stage 106 in order to explain any selection bias with the non-treatment variables. The second stage 108 is warm-started from the first stage 106 to optimize using the treatment variables.

The objective of the causal analysis performed by causal impact estimation model 118 is given by:

$$\hat{\tau}(X^i) = \mathbb{E}[Y_1^i - Y_0^i | X^i] \quad (6)$$

Where $T^i \in X^i$. This may be written as:

$$\hat{\tau}(X^i) = \mathbb{E}[Y_0^i | X^i)] - \mathbb{E}[Y_0^i | X^i] \quad (7)$$

However, since $\mathbb{E}[Y_1^i | X^i]$ and $\mathbb{E}[Y_0^i | X^i]$ may be modeled from non-overlapping population segments, the estimate may be biased. There are several approaches that attempt to match individuals in these population segments and compute conditional expectation. However, most of the matching is performed on projections (e.g., propensity and/or other distance metrics) and the assumptions may not hold true. On the other hand, modeling equation (6) directly has the problem that if some $x^i$s are correlated with treatment participation a biased estimate may still be obtained.

In order to motivate the approach, equation (6) may be rewritten as:

$$\hat{\tau}(X^i) = \mathbb{E}[(Y_1^i - Y^{-i}) + (Y^{-i} - Y_0^i) | X^i] \quad (8)$$

Where $Y^{-i}$ is the conditional expectation of outcome in the absence of the treatment variable.

$$Y^{-i} = \mathbb{E}[Y^i | X_i, T^i] \quad (9)$$

For ease of exposition, an assumption may be made that the treatment and control population size is the same given a particular $X^i$. The formulation may be trivially extended with non-equal treatment and control sizes. In such a case, $Y^{-i}$ becomes a weighted average of the outcomes in treatment and control populations.

Such an approach aids in separate modeling of equation (9). Values for $Y^{-i}|X^i$ may be used while solving equation (8). That is, $Y^{-i}|X^i$ may be modeled and set so that all information in $X^i \setminus T$ (e.g., elements that belong to $X^i$ and not T—referred to as "non-treatment variables") may be used prior to using information in T (treatment variable information), in a generalized setting. This way of modeling, helps to get an unbiased conditional expectation of treatment effect. Approaches such as double partialing out attempt to solve the problem in a similar way. However, such approaches ignore the condition portion in the third step of modeling (e.g., explaining unexplained outcome using unexplained treatment) which may lead to sub-optimal estimates in heterogeneous treatment effects. Such a sub-optimal outcome is due to the error (in the first two stages of modeling) being distributed among treatment and control populations non-parametrically in each hyperspace defined by the features. If the hyperspace in which the errors are distributed is ignored, equation (8) will be unable to be reconstructed.

Accordingly, in causal impact estimation model 118, $Y^{-i}|X^i$ is first modeled and set during training of first stage 106. First stage 106 may be trained using a non-parametric algorithm. The causal impact estimation model 118 is further optimized in the second stage 108 (as warm-started using the first stage 106) using T alone. That is, the residual is optimized for using treatment variables (and not non-treatment variables), in each hyperspace identified by the first stage 106. An implementation in a DNN framework is described below.

Training first stage 106 by optimizing weights of only non-treatment nodes may absorb any selection bias realized through features in the data. Prediction using such a model, as trained on a reduced dimension (e.g., treatment variables are not used to train first stage 106), yields residual error comprising: (i) noise in the data, and (ii) the portion of the variance unexplained due to the absence of the treatment variable in the training of first stage 106. The portion of the variance unexplained due to the absence of one or multiple dimensions (e.g., one or more treatment variables) is averaged out by the model. The averaging of error, by the model, due to the absence of the treatment variable dimension(s) may not be uniform in all the other non-treatment variable dimensions. This averaging of error on other dimensions depends on the particular training algorithm used and the hyper-space that the models operate on internally. Nevertheless, once the first stage 106 is trained using only non-treatment variables as predictors using out-of-sample validation, the model has used all selection bias signals that are observable directly or indirectly.

Accordingly, first stage 106 takes the input features except the treatment variables as input and at the output layer 128, generates the conditional expectation of the outcome in the absence of the treatment variable ($\mathbb{E}[Y_i | X^i \backslash T^{-i}]$). The hidden layer(s) 126 compute a high dimensional non-linear function that captures most of the variance in the data, to the extent possible without using treatment variables. Further the first stage 106 may be tuned using out-of-sample validation data to prevent over-fitting to noise data.

The second stage 108 uses the weights of input layer 124 for non-treatment nodes 120 in input layer 134. The weights of treatment node(s) 122 in input layer 134 may be initialized using random low values. The second stage 108 uses treatment and non-treatment variables as predictors of output, but adjusts weights only if there is more information in treatment variables to infer the outcome. In other words, the second stage 108 adjusts weights such that the error due to the absence of treatment variables in the first stage 106 is minimized. Output layer 138 estimates $\mathbb{E}[Y_i | X^i]$ (the expectation of the outcome in the presence of the treatment variable), where $X^i$ includes the treatment variables $T^i$. Further, out-of-sample tuning allows for generation of models that are generalized enough such that the estimates are statistically significant. As previously described, in various examples, during training of second stage 108, weights of non-treatment nodes 120 may be maintained (e.g., the weights for non-treatment nodes 120 in input layer 134 are kept the same as the weights learned for non-treatment nodes 120 for input layer 124 during training of first stage 106). Weights for treatment node(s) 122 of input layer 134, weights for nodes of hidden layer(s) 136, and weights between hidden layer(s) 136 and output layer 138 may be optimized/adjusted during training of second stage 108 according to the particular training algorithm(s) used.

Once second stage 108 is trained from pre-trained first stage 106, causal impact of a treatment variable may be determined by scoring individuals with and without the treatment variable set (e.g., treatment_variable=True; and treatment_variable=False) and determining the difference between the two predictions. For an individual with features $X^i \backslash T^i = x$, the causal impact may be estimated as:

$$\hat{\tau}(x) = (\widehat{\mathcal{Y}}_1^i | x) - (\widehat{\mathcal{Y}}_0^i | x) \quad (10)$$

Which may be realized through:

$$\hat{\tau}^i(x) = (\widehat{\mathcal{Y}}^i | x, T^i=1) - (\hat{y}^i | x, T^i=0) \quad (11)$$

Since the second stage 108 is trained from pre-trained first stage 106, treatment variables will only be able to optimize the second stage 108 if there is further optimization possible due to the addition of the treatment variable. In other words, causal impact determined using the second stage 108 will be high only when there is a high influence of the treatment variable on the outcome. In various examples, it may be beneficial to perform scoring on a held-out validation set to obtain statistically significant conditional average causal impact estimates or to ensure that the causal impact estimates obtained on whole treatment data is statistically significant.

Configuring and Tuning the DNN

In various examples, first stage 106 may be trained separately and/or prior to second stage 108. First stage 106 and second stage 108 may each be a DNN implemented by one or more computing devices. Second stage 108 may be similar to first stage 106, except for the input layers 124, 134. All the configurations between first stage 106 and second stage 108 may be the same, and the same tuning (hyper parameter optimization) process, apart from the differences described above in reference to training of first stage 106 and second stage 108, may be used for both the first stage 106 and second stage 108. Various parameters may be tuned in order to optimize the causal impact estimation model 118. For example, the number of hidden layers 126, 136, hidden units, choice of activation functions at hidden and output layers, learning rate, learning rate decay, number of iterations, batch size, regularization parameter, optimization function, etc., may be tunable to optimize performance.

Multi-Touch

In examples where multiple treatment variables are involved, the causal impact estimation model 118 supports multi-touch causal analysis for estimating the causal impact of multiple treatment variables on an outcome of interest. For multi-touch analysis, the second stage 108 is warm-started using the weights determined from first stage 106, as described above. Second stage 108 is trained using the desired treatment variables. After training, the second stage 108 may be used to estimate the incremental causal impact of a particular treatment variable by scoring an individual with and without the treatment variable and determining the difference in the outcome. This procedure may be repeated for each treatment variable of interest. Advantageously, the causal impact estimation model 118, trained in this way, is able to estimate the incremental impact of a single treatment variable without being influenced by other treatment variables. Additionally, only a single machine learning model (e.g., causal impact estimation model 118) is used to estimate treatment effects for any number of events.

Impact of Incremental Units of Event Participation

In various examples, causal analysis techniques may seek to understand the impact of incremental participation in a particular event. For example, what is the incremental effect of an additional hour of video-streaming on an individual's subsequent behavior or what is the incremental effect of nth purchase versus n-1th purchase. Current methods have limitations in estimating such impacts and rely on a multitude of assumptions. One such method is to obtain treatment and control populations for each incremental level and repeat the causal impact estimation for each subgroup. Such a methodology is neither scalable nor reliable since there are several ambiguities in the definitions of the treatment and control groups. However, the causal impact estimation model 118 is able to achieve scalability. For a scalable use case, participation quantity (in appropriate units) may be used for events to indicate the number of times that an individual has participated in the event. Such units may be of any granularity depending on the requirement. The second stage 108 may be trained using the selected participation quantity values instead of binary participation indicators (e.g., Boolean True or False) for treatment variables. Once the causal impact estimation model 118 is trained (including the training of first stage 106 and second stage 108), individuals can be scored twice by setting the treatment participation quantity according to the requirement. For example, for nth versus n-1th participation by an individual, the first score is obtained by setting the treatment variable to participation quantity n and scoring. The second score is obtained by setting the treatment variable to participation quantity n−1 (e.g., n+/−1) and scoring. The difference between the two scores gives the estimated incremental causal impact of exposure to an incremental instance of the event (e.g., the causal impact of the nth participation versus the n−1th or n+1th participation).

Impact of Interaction Effects of Events

The second stage 108, which has more input nodes added to the first stage 106 (e.g., by training the treatment nodes 122), captures interactions among the treatment variables. Accordingly, the causal impact estimation model 118 may be used to estimate the interaction effects between treatment variables. For such a use case, individuals are scored twice by changing the appropriate treatment variables for the interaction. For example, it may be desired to understand the interaction between an individual's first use of a music streaming service and the individual's first usage of a voice assistant service. Truth values may be set for these treatment variables to cover all possible interactions (e.g., (0,0), (0,1), (1,0), (1,1)) and the scores may be obtained for each pair. The scores may then be compared to investigate the impact of each of the four choices. Additionally, the impact on the disjunctive interaction of events may be determined using the above-described techniques.

In various examples, a single model may be trained for a variety of systems by scaling outcome and input variables to be in the same range during training. For example, a causal impact estimation model 118 may be trained to predict the impact of a treatment variable on individuals in a first geographic location. The causal impact estimation model 118, as trained for the first geographic location, may thereafter be used to predict impact of the treatment variable in a second geographic location. A variable representing the event of interest may be used as a treatment variable to score individuals in the second geographic location. Individuals may be scored with and without the treatment variable set to estimate causal impact of the event on the outcome for individuals in the second geographic location. Additionally, the impact and/or benefit of new activities and/or new systems can be forecasted using the causal impact estimation model 118 trained for existing systems prior to launch of the new activity or system. Additionally, the same causal impact estimation model 118 may be used to perform adhoc analysis for treatment variables of interest. In one example implementation, the second stage 108 may be warm started, as described above, using weights from the input layer 124 of first stage 106. New treatment variables of interest for the adhoc analysis may be added to input layer 134 of second stage 108 and may be used to optimize second stage 108. In a second example implementation, a third stage may be trained. The third stage may be warm started from the weights of input layer 134. New input layer nodes may be added to the third stage to account for new treatment variables of interest for the adhoc analysis. The third stage may improve the outcome prediction if there is an incremental treatment effect that is not captured by the features or treatment variables already in the first stage 106 and/or second stage 108.

In various examples, the techniques described herein may be effective to speed up machine learning model building. Deep Learning frameworks converge faster if the initial weights are closer to the optimum. In cases where the machine learning models (e.g., first stage 106, second stage 108) are repeatedly trained over time, since a strong correlation exists among data belonging to consecutive training instances (e.g., first stage 106 and second stage 108), the optimal weights for a training instance's network may be closer to the optimal weights from the previous instance. Accordingly, it may be beneficial to use weights from the previous training instance as initial weights for the next instance during training (exponential moving average weighting can also be considered to be less sensitive to seasonal spikes).

An assumption is made that because the trained model is doing matching implicitly and is optimized on out-of-sample validation there is no value addition by doing additional propensity weighting/matching of treatment and control population. Nevertheless, the causal impact estimation model 118 framework may be extended to use propensity weighting/matching. A separate multi-class deep learning network using pre-event features as input variables and each of the treatment variables as nodes in an output layer may be used to incorporate propensity weighting/matching. Such a deep learning network would provide the propensity scores for each output layer node (treatment variable). Since an individual can participate in more than one treatment, the constraint that the probabilities sum to 1 may be relaxed. Unlike the convention of scaling the probabilities at the nodes of output layer, in this network, a sigmoid may be applied at each output layer node to determine the probability of participating in the treatment event, independent of other treatment variables. Once the propensity network is built, the propensity for treatment and control individuals can be obtained from the model and can be used with outputs from second stage 108 or the additional deep learning network described above to determine propensity-weighted/matched causal impact estimates. Additionally, in some examples, the propensity output nodes may be included as part of second stage 108 instead of using an additional stage deep learning network. The final layer of second stage 108 may be defined differently according to the target variables. Additionally, in another example, the previously-trained first stage 106 may be used to warm start and build the new propensity network by changing the target variable. Such a technique further reduces the time required for the model to converge relative to training a network from randomly-initialized values.

Among other potential benefits, the causal impact estimation models described herein may generate synthetic twins rather than matching non-treatment individuals with treatment individuals. Accordingly, implicit and direct generation of synthetic twins by matching each dimension other than the treatment variable may reduce selection bias. Additionally, matching of treatment individuals and controls is performed in a high dimension rather than on a projection such as a propensity score, LSH, and/or other norms. Accordingly, there is less chance of selection bias. Further, optimization is performed on the outcome of interest (e.g., effect of the treatment variable(s) on the outcome of interest). Therefore, fewer assumptions are used. Additionally, using the causal impact estimation models described herein, if there is no match between a treatment individual and a control individual, the computed causal impact is zero, rather than providing artificially-inflated results as with some current causal estimation models. Further, since the causal impact estimation models complexity is selected based on out-of-sample accuracy, statistical significance is ensured. In some additional examples, the same model may be used for multiple treatment variables without one treatment variable influencing another. Additionally, the causal impact estimation models described herein may be used to understand the causal impact of incremental units of event participation. The incremental units may be of any granularity.

Figure 2:
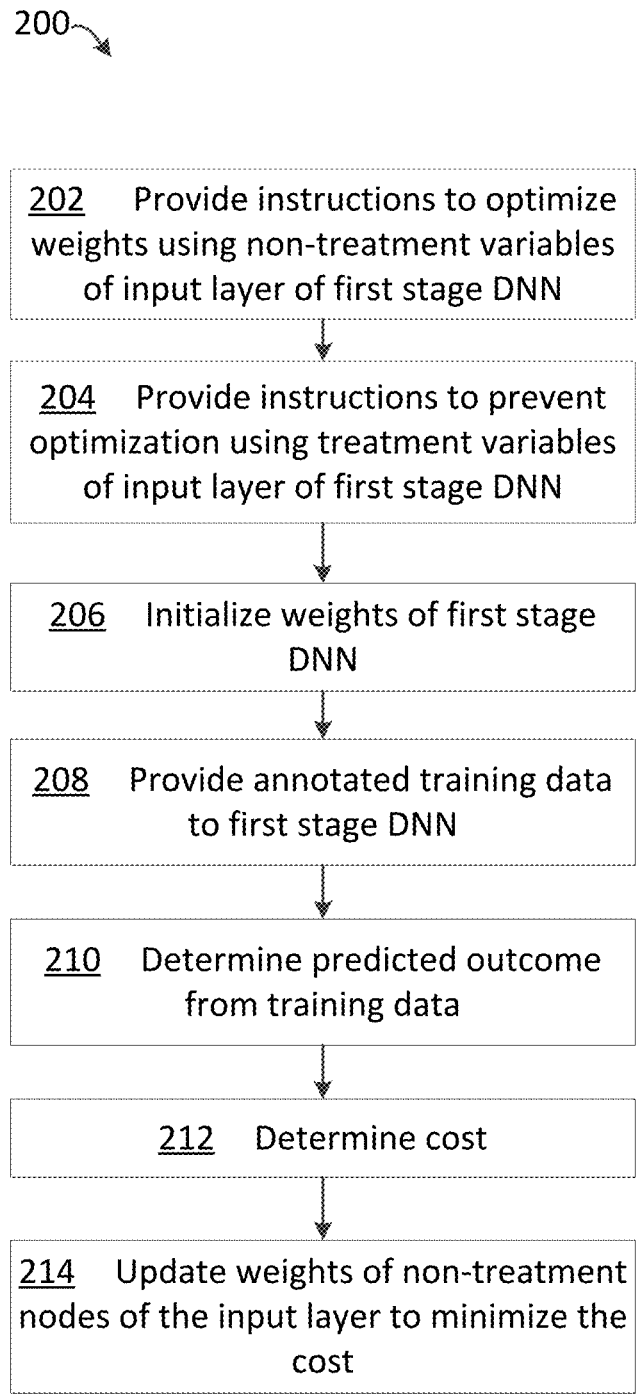
FIG. 2 depicts a process for training a first stage of a causal impact estimation model, in accordance with various aspects of the present disclosure.

FIG. 2 depicts a process 200 for training a first stage of a causal impact estimation model, in accordance with various aspects of the present disclosure. The process 200 of FIG. 2 may be executed by one or more computing device(s) 102. The actions of process 200 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 200 may be described above with reference to elements of FIG. 1.

Processing may begin at action 202, "Provide instructions to optimize weights using non-treatment variables of input layer of first stage DNN". At action 202, instructions may be provided that are effective to set non-treatment nodes of first stage 106 to be optimized during training. In other words, first stage 106 may be optimized using non-treatment variables. In various examples, this optimization may include updating and/or adjusting the weights of non-treatment nodes 120 of input layer 124 to minimize a cost function associated with outputs of first stage 106.

Processing may continue from action 202 to action 204, "Provide instructions to prevent optimization using treatment variables of input layer of first stage DNN". At action 204, instructions may be provided that are effective to set treatment nodes of first stage 106 to not be optimized during training. In other words, first stage 106 may be optimized using only non-treatment variables and not treatment variables. Accordingly, weights associated with treatment node(s) 122 of input layer 124 may be maintained during training of first stage 106 of causal impact estimation model 118.

Processing may continue from action 204 to action 206, "Initialize weights of first stage DNN". At action 206, weights of nodes of first stage 106 may be initialized. In various examples, the initial weights may be randomly selected. However, in at least some examples, weights may be initialized by using weights from a previously-trained model, such as a previously-trained version of first stage 106. Processing may continue from action 206 to action 208, "Provide annotated training data to first stage DNN". At action 208, annotated training data may be provided to the input layer 124 of first stage 106. Annotated training data may be represented as feature vectors in a high dimensional space. For example, training data may comprise data representations of non-treatment variables for a plurality of individuals. In some examples, non-treatment variables may be represented numerically through the activation of non-treatment nodes 120 in input layer 124. Annotations of training data may comprise an outcome (e.g., an observed, real world outcome of interest) associated with the individual.

Processing may continue from action 208 to action 210, "Determine predicted outcome from training data". At action 210, the first stage 106 may generate an outcome represented by activation of nodes in output layer 128. As will be understood by those of ordinary skill in the art, for each node of first stage 106, the activation is determined by summing all of the weighted input nodes connected to the node and passing the sum to an activation function (e.g., a sigmoid function, the ReLu function, etc.) that controls the activation of the node. The activation of nodes in output layer 128 encodes some outcome (e.g., a blood pressure score, a confidence that an input image corresponds to a human, etc.). For a given training iteration of first stage 106, the outcome encoded in output layer 128 represents the outcome for the current set of weights associated with the various layers of first stage 106.

Processing may continue from action 210 to action 212, "Determine cost". At action 212, a cost function may be determined that represents the difference between the output prediction and the ground truth data included in the annotated training data provided. At action 214, weights of non-treatment nodes of the input layer (as well as other weights of first stage 106) are updated to minimize the cost. As known to those of ordinary skill in the art, weights are adjusted proportionally depending on the amount by which the particular weight contributed to the cost. Training the first stage 106 by optimizing using only non-treatment variables may absorb the effects of non-treatment variables on the outcome and may thereby reduce selection bias when using causal impact estimation model 118.

Figure 3:
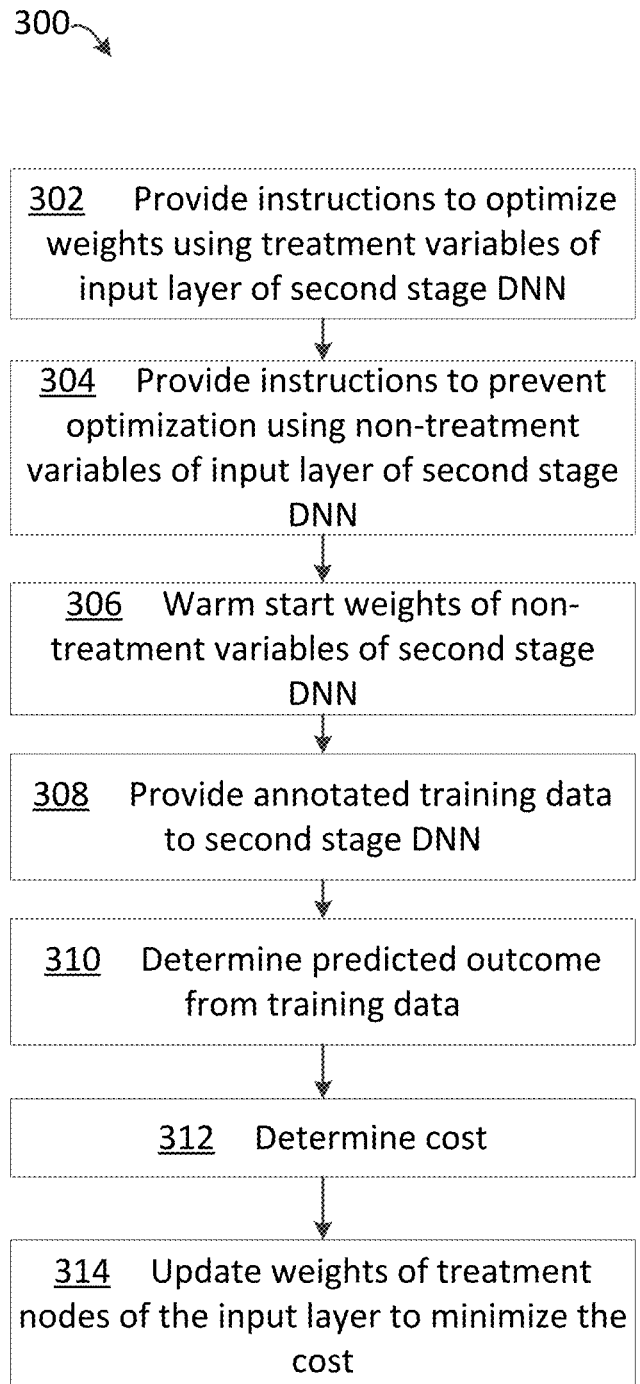
FIG. 3 depicts a process for training a second stage of a causal impact estimation model, in accordance with various aspects of the present disclosure.

FIG. 3 depicts a process 300 for training a second stage of a causal impact estimation model, in accordance with various aspects of the present disclosure. The process 300 of FIG. 3 may be executed by computing device(s) 102. The actions of process 300 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 300 may be described above with reference to elements of FIGS. 1 and 2.

Processing may begin at action 302, "Provide instructions to optimize weights using treatment variables of input layer of second stage DNN". At action 302, instructions may be provided that are effective to set treatment nodes of second stage 108 to be optimized during training. In other words, second stage 108 may be optimized using treatment variables. In various examples, this optimization may include updating and/or adjusting the weights of treatment node(s) 122 of input layer 134 to minimize a cost function associated with outputs of second stage 108.

Processing may continue from action 302 to action 304, "Provide instructions to prevent optimization using non-treatment variables of input layer of second stage DNN". At action 304, instructions may be provided that are effective to set non-treatment nodes of second stage 108 to not be optimized during training. In other words, second stage 108 may be optimized using only treatment variables and not non-treatment variables. Accordingly, weights associated with non-treatment node(s) 120 of input layer 134 may be maintained during training of second stage 108 of causal impact estimation model 118.

Processing may continue from action 304 to action 306, "Warm start weights of non-treatment variables of second stage DNN". At action 306, weights of non-treatment nodes 120 of input layer 134 of second stage 108 may be warm started using weights determined for non-treatment nodes 120 in input layer 124 during the prior training of first stage 106. Additionally, in at least some examples, weights of hidden layer(s) 136 may be warm-started from weights of hidden layer(s) 126 of previously-trained first stage 106. In at least some examples, while weights of non-treatment nodes 120 in input layer 134 may be maintained during training of second stage 108, weights of hidden layer(s) 136 may be updated during training of second stage 108. Weights of hidden layer(s) 136 may be updated during training.

Processing may continue from action 306 to action 308, "Provide annotated training data to second stage DNN". At action 308, annotated training data may be provided to the input layer 134 of second stage 108. Annotated training data may be represented as feature vectors in a high dimensional space. For example, training data may comprise data representations of treatment variables (and/or non-treatment variables) for a plurality of individuals. In some examples, treatment variables may be represented numerically through the activation of treatment nodes 122 in input layer 134. Activation of treatment nodes 122 may be binary or non-binary. Annotations of training data may comprise an outcome (e.g., an observed, real world outcome of interest) associated with the individual.

Processing may continue from action 308 to action 310, "Determine predicted outcome from training data". At action 310, the second stage 108 may generate an outcome represented by activation of nodes in output layer 138. As will be understood by those of ordinary skill in the art, for each node of second stage 108, the activation is determined by summing all of the weighted input nodes connected to the node and passing the sum to an activation function (e.g., a sigmoid function, the ReLu function, etc.) that controls the activation of the node. The activation of nodes in output layer 138 encodes some outcome (e.g., a blood pressure score, a confidence that an input image corresponds to a human, etc.). For a given training iteration of second stage 108, the outcome encoded in output layer 138 represents the outcome for the current set of weights associated with the various layers of second stage 108.

Processing may continue from action 310 to action 312, "Determine cost". At action 312, a cost function may be determined that represents the difference between the output prediction and the ground truth data included in the annotated training data provided. At action 314, weights of treatment nodes of the input layer (as well as other weights of second stage 108) are updated to minimize the cost. As known to those of ordinary skill in the art, weights are adjusted proportionally depending on the amount by which the particular weight contributed to the cost. After training second stage 108 as warm-started using the weights of the non-treatment nodes obtained during the training of first stage 106 (e.g., FIG. 2), a causal, incremental impact of a treatment variable may be estimated by determining two scores for an individual—one score with the treatment variable set, and one score with the treatment variable unset (e.g., Equation 10). Setting and unsetting the treatment variable while maintaining all non-treatment variables is a direct and implicit method of synthetic twin generation and reduces selection bias.

Figure 4:
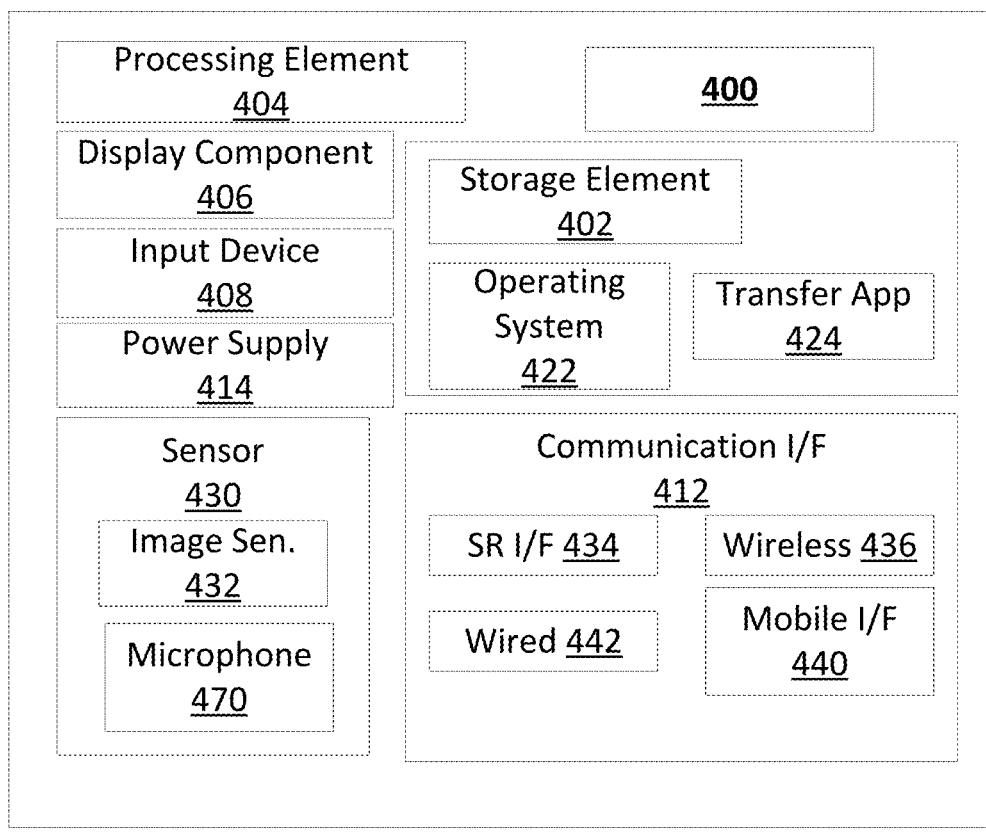
FIG. 4 depicts an example architecture of a computing device that may be used, in accordance with various aspects of the present disclosure.

FIG. 4 is a block diagram showing an example architecture 400 of a computing device, such as the processors and other computing devices described herein. In various examples, architecture 400 may be used to implement one or more of the various techniques described herein. It will be appreciated that not all user devices will include all of the components of the architecture 400 and some user devices may include additional components not shown in the architecture 400. The architecture 400 may include one or more processing elements 404 for executing instructions and retrieving data stored in a non-transitory computer-readable storage element 402. The processing element 404 may comprise at least one processor. Any suitable processor or processors may be used. For example, the processing element 404 may comprise one or more digital signal processors (DSPs) and/or image signal processors (ISPs). In some examples, the processing element 404 may be effective to perform one or more functions of computing device(s) 102. For example, processing element 404 may be effective to train first stage 106 and/or second stage 108, as described herein. Additionally, in various examples, processing element 404 may be effective to implement, in whole or in part, the causal impact estimation model 118 described herein.

The storage element 402 can include one or more different types of non-transitory, computer-readable memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc.

The storage element 402 may also store software for execution by the processing element 404. An operating system 422 may provide the user with an interface for operating the user device and may facilitate communications and commands between applications executing on the architecture 400 and various hardware thereof. A transfer application 424 may be configured to receive data from another device (e.g., from another computing device).

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 400 may also include one or more input devices 408 operable to receive inputs from a user. The input devices 408 can include, for example, a push button, touch pad, touch screen, wheel, joystick, keyboard, mouse, trackball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 for capturing sounds, such as voice commands.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other user devices. For example, the communication interface 412 may comprise a wireless communication module 436 configured to communicate on a network, such as the network 104, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A wired communication module 442 may be configured to communicate according to the USB protocol or any other suitable protocol.

The architecture 400 may also include one or more sensors 430 such as, for example, one or more position sensors, image sensors, microphones, and/or motion sensors. An image sensor 432 and microphone 470 is shown in FIG. 4. Some examples of the architecture 400 may include multiple image sensors 432 and/or multiple microphones 470.

Figure 5:
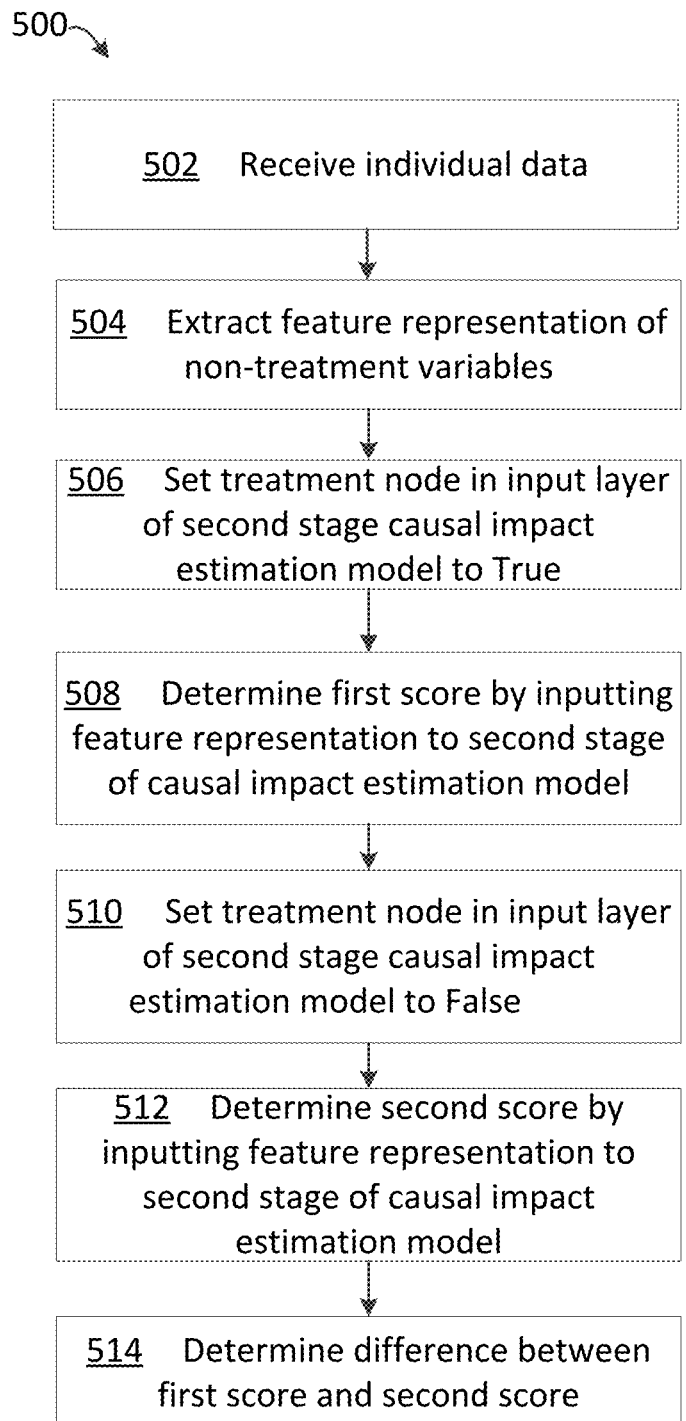
FIG. 5 depicts a process for estimating a causal impact of an event, in accordance with various aspects of the present disclosure.

FIG. 5 depicts a process 500 for estimating a causal impact of an event, in accordance with various aspects of the present disclosure. The process 500 of FIG. 5 may be executed by computing device(s) 102. The actions of process 500 may represent a series of instructions comprising computer-readable machine code executable by a processing unit of a computing device. In various examples, the computer-readable machine code may be comprised of instructions selected from a native instruction set of the computing device and/or an operating system of the computing device. Various actions in process 500 may be described above with reference to elements of FIGS. 1-4.

Processing may begin at action 502, "Receive individual data". At action 502, individual data may be received for performing a prediction of an outcome (e.g., an outcome for which second stage 108 has been trained to predict). Individual data may include information regarding an individual person, a system, an entity, etc. For example, if a second stage DNN has been trained to predict blood pressure based on individual characteristics such as age, weight, height, smoking status (smoker vs. non-smoker), and/or amount of exercise per week, the individual data may comprise values for these individual characteristics. In this example, the treatment variable may be a binary variable representing whether or not the individual takes a particular medicine.

Processing may continue from action 502 to action 504, "Extract feature representation of non-treatment variables". In various examples, a trained DNN (e.g., trained second stage 108) may be effective to process and extract feature data (e.g., a vector representation) from input data. Accordingly, at action 504, feature data may be extracted by the second stage 108 from the individual data received at action 502. In various other examples, the individual data received at action 502 may be in feature form and thus action 504 may be unnecessary.

Processing may continue from action 504 to action 506, "Set treatment node in input layer of second stage causal impact estimation to True". At action 506, the treatment node representing whether or not the individual has taken the medicine may be set to True to represent that the individual has taken the medicine. Processing may continue from action 506 to action 508, "Determine first score by inputting feature representation to second stage of causal impact estimation model". The second stage DNN may be effective to generate an outcome based on the input feature data and based on the treatment node being set to True. The outcome may be the first score (e.g., a predicted blood pressure for the individual when the individual has taken the medicine).

Processing may continue from action 508 to action 510, "Set treatment node in input layer of second stage causal impact estimation to False". At action 510, the treatment node representing whether or not the individual has taken the medicine may be set to False to represent that the individual has not taken the medicine. Processing may continue from action 510 to action 512, "Determine second score by inputting feature representation to second stage of causal impact estimation model". The second stage DNN may be effective to generate an outcome based on the input feature data and based on the treatment node being set to False. The outcome may be the second score (e.g., a predicted blood pressure for the individual when the individual has not taken the medicine).

Processing may continue from action 512 to action 514, "Determine difference between first score and second score". At action 514, a difference between the first score, at which the event has occurred (treatment variable=True), and the second score, at which the event has not occurred (treatment variable=False) is determined. The difference value represents the estimated causal impact of the event on the predicted outcome. Additionally, because the second stage has been trained in accordance with the various techniques described herein, synthetic twin generation is implicit and direct, and bias is reduced.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

Figure 6:
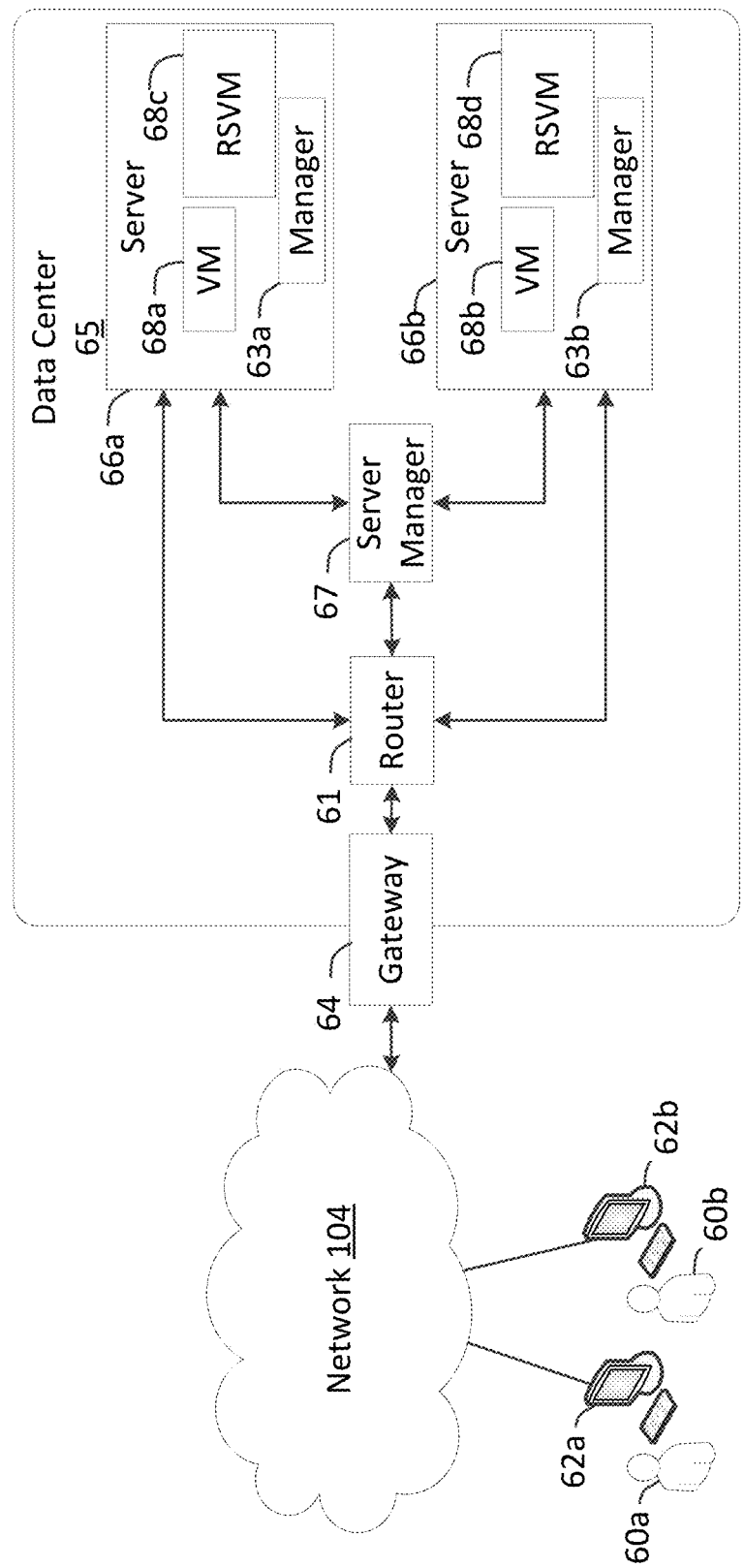
FIG. 6 is a diagram illustrating an example system for sending and providing data that may be used in accordance with the present disclosure.

An example system for sending and providing data and generation of synthetic data for computer vision object detection models will now be described in detail. In particular, FIG. 6 illustrates an example computing environment in which the embodiments described herein may be implemented. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of lower latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another, or may be combined in various ways. All possible combinations and subcombinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A machine-learning method for estimating a causal impact of an event, the method comprising:
training a first machine learning model using a first training protocol, the first training protocol comprising:
providing first instructions to maintain a first weight associated with a first node in an input layer of the first machine learning model during the first training protocol, wherein the first node represents a treatment variable indicating whether or not an individual has been exposed to the event, and wherein maintaining the first weight comprises maintaining a same value for the first weight during the first training protocol;
providing second instructions to adjust a second weight associated with a second node in the input layer of the first machine learning model during the first training protocol, wherein the second node represents a non-treatment variable indicating an attribute associated with the individual;
sending first training data to the first machine learning model; and
adjusting the second weight associated with the second node from an original value to an updated value by minimizing a first cost function associated with the first machine learning model, and maintaining the first weight of the first node in response to the first instructions; and
training a second machine learning model using a second training protocol, the second training protocol comprising:
setting a third weight of a third node in an input layer of the second machine learning model to the updated value, wherein the third node of the second machine learning model represents the non-treatment variable;
providing third instructions effective to adjust a fourth weight associated with a fourth node in the input layer of the second machine learning model, wherein the fourth node represents the treatment variable indicating whether or not the individual has been exposed to the event;
sending second training data to the second machine learning model;
adjusting the fourth weight associated with the fourth node by minimizing a second cost function associated with the second machine learning model, and maintaining the third weight of the third node;
receiving, by the second machine learning model, first input data representing a person, the first input data comprising a first value for the treatment variable indicating that the person has been exposed to the event and a first value for the non-treatment variable indicating the attribute associated with the person; and
generating, in an output layer of the second machine learning model, a first score associated with a first predicted outcome.

2. The method of claim 1, further comprising:
generating synthetic twin data representing a counterfactual representation of the person, wherein generating the synthetic twin data comprises:
adjusting the first value for the treatment variable from the first value to a second value, wherein the second value indicates that the person has not been exposed to the event; and
maintaining the first value for the non-treatment variable indicating the attribute associated with the person.

3. The method of claim 2, further comprising:
receiving, by the second machine learning model, second input data comprising the synthetic twin data;
generating, in the output layer of the second machine learning model, a second score associated with a second predicted outcome; and
determining a difference value between the first score and the second score, wherein the difference value represents an estimation of the causal impact of the event on an outcome.

4. A method comprising:
training a first machine learning model using a first training protocol, the first training protocol comprising:
receiving, by at least one computing device, first instructions for the first machine learning model implemented by the at least one computing device, the first instructions configuring the first machine learning model to update weights associated with non-treatment variables and to maintain weights associated with treatment variables during training of the first machine learning model, wherein maintaining weights associated with treatment variables during training comprises maintaining a same weight value for at least one treatment variable node during training of the first machine learning model;
receiving, by the at least one computing device, first training data; and
updating, by the at least one computing device, a first weight associated with a first node of the first machine learning model from a first value to a second value based at least in part on the first training data, wherein the first node is associated with a non-treatment variable; and
training a second machine learning model using a second training protocol, the second training protocol comprising:
receiving, by the at least one computing device, second instructions for the second machine learning model implemented by the at least one computing device, the second instructions configuring the second machine learning model to update weights associated with the treatment variables during training of the second machine learning model;
receiving, by the at least one computing device, second training data; and
updating, by the at least one computing device, a second weight associated with a second node of the second machine learning model, wherein the second node is associated with a treatment variable associated with exposure to an event; and
receiving, by the second machine learning model, first input data, wherein the first input data comprises a third value for the non-treatment variable and a fourth value for the treatment variable; and
generating, by the second machine learning model, a first predicted outcome based on the first input data.

5. The method of claim 4, further comprising setting a third weight associated with a third node of the second machine learning model to the second value, wherein the third node is associated with the non-treatment variable.

6. The method of claim 5, further comprising receiving, by the at least one computing device, instructions to maintain the second value as the third weight associated with the third node during training of the second machine learning model.

7. The method of claim 4, further comprising generating second input data from the first input data, wherein generating the second input data comprises changing the fourth value for the treatment variable to a fifth value, wherein the fifth value indicates a lack of exposure to the event.

8. The method of claim 7, further comprising:
receiving, by the second machine learning model, the second input data;
generating, by the second machine learning model, a second predicted outcome based on the second input data; and
determining a difference between the first predicted outcome and the second predicted outcome, wherein the difference between the first predicted outcome and the second predicted outcome comprises an estimated causal impact of exposure to the event associated with the treatment variable.

9. The method of claim 4, wherein the treatment variable is a first treatment variable and the event is a first event, the method further comprising:
updating, by the at least one computing device, a third weight associated with a third node of the second machine learning model, wherein the third node is associated with a second treatment variable associated with a second event different from the first event;
receiving, by the second machine learning model, second input data, wherein the second input data comprises a fifth value for the non-treatment variable, a sixth value for the first treatment variable, and a seventh value for the second treatment variable, the seventh value indicating exposure to the second event; and
generating, by the second machine learning model, a second predicted outcome based on the second input data, wherein the second predicted outcome is associated with exposure to the second event and non-exposure to the first event.

10. The method of claim 4, wherein the second training data comprises participation quantity values indicating a number of times that an individual has participated in the event, the method further comprising:
receiving, by the second machine learning model, a first participation quantity value, wherein the first predicted outcome is generated based at least in part on the first participation quantity value.

11. The method of claim 10, further comprising:
modifying the first participation quantity value to a second participation quantity value, wherein the second participation quantity value is equal to the first participation quantity value +/−1;
receiving, by the second machine learning model, second input data comprising the second participation quantity value; and
generating, by the second machine learning model, a second predicted outcome based at least in part on the second input data.

12. The method of claim 11, further comprising:
determining a difference between the first predicted outcome and the second predicted outcome, wherein the difference between the first predicted outcome and the second predicted outcome comprises an estimated incremental causal impact of exposure to an incremental instance of the event associated with the treatment variable.

13. A computing system, comprising:
at least one processor; and
a non-transitory computer-readable memory storing instructions that, when executed by the at least one processor, program the at least one processor to perform a method comprising:
training a first machine learning model using a first training protocol, the first training protocol comprising:
receiving first instructions for the first machine learning model implemented by the at least one processor, the first instructions configuring the first machine learning model to update weights associated with non-treatment variables and to maintain weights associated with treatment variables during training of the first machine learning model, wherein maintaining weights associated with treatment variables during training comprises maintaining a same weight value for at least one treatment variable node during training of the first machine learning model; and
updating, by the at least one processor, a first weight associated with a first node of the first machine learning model from a first value to a second value based at least in part on first training data, wherein the first node is associated with a non-treatment variable; and
training a second machine learning model using a second training protocol, the second training protocol comprising:
receiving, by the at least one processor, second instructions for the second machine learning model implemented by the at least one computing device, the second instructions configuring the second machine learning model to update weights associated with the treatment variables during training of the second machine learning model; and
updating, by the at least one processor, a second weight associated with a second node of the second machine learning model based at least in part on second training data, wherein the second node is associated with a treatment variable associated with exposure to an event; and
receiving, by the second machine learning model, first input data, wherein the first input data comprises a third value for the non-treatment variable and a fourth value for the treatment variable; and
generating, by the second machine learning model, a first predicted outcome based on the first input data.

14. The computing system of claim 13, wherein the instructions, when executed by the at least one processor, program the at least one processor to perform the method further comprising setting a third weight associated with a third node of the second machine learning model to the second value, wherein the third node is associated with the non-treatment variable.

15. The computing system of claim 14, wherein the instructions, when executed by the at least one processor, program the at least one processor to perform the method further comprising maintaining the second value as the third weight associated with the third node during training of the second machine learning model.

16. The computing system of claim 13, wherein the instructions, when executed by the at least one processor, program the at least one processor to perform the method further comprising generating second input data from the first input data, wherein generating the second input data comprises changing the fourth value for the treatment variable to a fifth value, wherein the fifth value indicates a lack of exposure to the event.

17. The computing system of claim 16, wherein the instructions, when executed by the at least one processor, program the at least one processor to perform the method further comprising:
receiving, by the second machine learning model, the second input data;
generating, by the second machine learning model, a second predicted outcome based on the second input data; and
determining a difference between the first predicted outcome and the second predicted outcome, wherein the difference between the first predicted outcome and the second predicted outcome comprises an estimated causal impact of exposure to the event associated with the treatment variable.

18. The computing system of claim 13, wherein the treatment variable is a first treatment variable, the event is a first event, and wherein the instructions, when executed by the at least one processor, program the at least one processor to perform the method further comprising:
updating a third weight associated with a third node of the second machine learning model, wherein the third node is associated with a second treatment variable associated with a second event different from the first event;
receiving, by the second machine learning model, second input data, wherein the second input data comprises a fifth value for the non-treatment variable, a sixth value for the first treatment variable, and a seventh value for the second treatment variable, the seventh value indicating exposure to the second event; and
generating, by the second machine learning model, a second predicted outcome based on the second input data, wherein the second predicted outcome is associated with exposure to the second event and non-exposure to the first event.

19. The computing system of claim 13, wherein the instructions, when executed by the at least one processor, program the at least one processor to perform the method further comprising receiving, by the second machine learning model, a first participation quantity value, wherein the first predicted outcome is generated based at least in part on the first participation quantity value.

20. The computing system of claim 19, wherein the instructions, when executed by the at least one processor, program the at least one processor to perform the method further comprising:
modifying the first participation quantity value to a second participation quantity value, wherein the second participation quantity value is equal to the first participation quantity value +/−1,
receiving, by the second machine learning model, second input data comprising the second participation quantity value; and
generating, by the second machine learning model, a second predicted outcome based at least in part on the second input data.

* * * * *